United States Patent [19]

Schwank

[11] Patent Number: 5,139,415

[45] Date of Patent: Aug. 18, 1992

[54] RADIATION HEATER

[75] Inventor: Bernd H. Schwank, Cologne, Fed. Rep. of Germany

[73] Assignee: Schwank GmbH, Cologne, Fed. Rep. of Germany

[21] Appl. No.: 599,777

[22] Filed: Oct. 17, 1990

[30] Foreign Application Priority Data

May 25, 1990 [DE] Fed. Rep. of Germany ....... 4016803

[51] Int. Cl.$^5$ .................... F23D 14/12; F23D 14/14; F23D 14/00
[52] U.S. Cl. .................................. 431/242; 431/208; 431/328; 431/329; 126/92 B; 126/92 AC
[58] Field of Search .................. 126/91 R, 91 B, 91 C, 126/91 AC; 431/243, 215, 242, 328, 329, 208

[56] References Cited

U.S. PATENT DOCUMENTS

| | | | |
|---|---|---|---|
| 3,203,413 | 8/1965 | Hartzell et al. | 126/92 B |
| 3,225,815 | 12/1965 | Bauer et al. | 431/329 |
| 3,237,679 | 3/1966 | Best | 126/42 B |
| 3,291,115 | 12/1966 | Forniti | 126/92 B |
| 3,434,466 | 3/1969 | Hine, Jr. | 126/92 R |
| 4,269,590 | 5/1981 | Baumanns | 126/92 B |

FOREIGN PATENT DOCUMENTS

| | | |
|---|---|---|
| 1164059 | 2/1958 | Fed. Rep. of Germany . |
| 2829075 | 3/1980 | Fed. Rep. of Germany . |
| 3012588 | 9/1983 | Fed. Rep. of Germany . |
| 27040 | 3/1924 | France .................. 126/92 B |
| 2624253 | 6/1989 | France . |
| 359861 | 3/1962 | Switzerland . |
| 314970 | 12/1971 | U.S.S.R. .............. 431/329 |
| 438723 | 11/1935 | United Kingdom ...... 126/92 B |

Primary Examiner—Carl D. Price
Attorney, Agent, or Firm—Diller, Ramik & Wight

[57] ABSTRACT

The invention relates to a radiation heater for air/gas admixtures which includes a double-wall housing of a generally trapezoidal transverse cross-section defined by a top wall and downwardly converging side walls. The housing includes a burner plate between a mixing chamber and a radiation grid, and the mixing chamber is fed the air/fuel admixture from an injector nozzle, a mixing tube, a preheated intermediate chamber, and a transition zone or chamber. The injector nozzle and the mixing tube are located at the lower edge of the housing side wall(s) to thereby provide an intermediate chamber extending essentially the length of the side wall(s) along the exterior of which the hot waste gases flow or brush to preheat the fresh admixture of air and fuel in the intermediate chamber thereby effecting reliable operation at low gas pressures and low manufacturing and repair costs.

18 Claims, 11 Drawing Sheets

RADIATION HEATER

BACKGROUND OF THE INVENTION

The invention relates to a radiation heater, particularly utilizing a gaseous fuel, having a double walled housing of a generally trapezoidal transverse cross-sectional configuration. The housing is defined by lateral or side walls diverging away from a top wall and opposite end walls collectively defining a peripheral edge which defines an opening of the housing. A ceramic plate burner is located between a mixing chamber and a radiation grid. An intermediate chamber houses an injector nozzle and a mixing tube which admixes air and fuel which is fed through the intermediate chamber and a transition chamber into the mixing chamber incident to combustion and the associated generation and radiation of heat.

A radiation heater of the type just described is disclosed in German Patent 30 12 588. The radiation heater of this patent is designed for use in those fields where a radiation heater is exposed to winds of high strengths or storms or very large drafty workplaces or sports arenas in which the individuals/spectators are heated by radiation. In such cases conventional radiation heaters have been found quite adequate. However, substantial design complexity is involved to guard against the adverse effect of high winds or drafts, both at the input side of the combustible air/fuel admixture and on the radiation side of the burner plate from which the hot waste gases discharge. Moreover, a comparatively high operational pressure is required for the fuel/air mixture. Such high operational pressures are required mainly when the radiation heater radiates heat vertically downwardly, and in such cases the prior art dictates the location of the fuel supply, the air supply, the mixing chamber, the injection nozzle and the mixing tube above the burner plate. As a result, a relatively large space, including the mixing chamber, is required inside the burner housing above the burner plate to locate the latter-listed items. Because of this, difficulties arise on the one hand in keeping the fuel/air supply or admixture on the intake side of the burner plate uniform, and on the other hand it is impossible to sufficiently intensely and uniformly preheat the fuel/air admixture—two objectives which are highly desirable. Representative of patents which evidence the design principle of mounting the supply of fuel and air above the burner plate can be found in U.S. Pat. No. 3,434,466; German Auslegeschrift 1,164,059; Swiss Patent No. 359,861; French Patent Application 2,624,253; and German Offenlegungsschrift 28 29 075.

SUMMARY OF THE INVENTION

Because of the latter and because only low gas pressures are available in many places, a primary object of the present invention is to provide a novel radiation heater which is of simple design and includes a relatively compact mixing chamber which allows reliable and effective operation even at relatively low gas pressures.

The novel invention resides in the location of the injector nozzle and the mixing tube at a lower edge of one of the housing sides or lateral walls within an intermediate chamber defined between the side wall and a wall inboard thereof. The mixing chamber is in fluid communication through a transition zone or chamber with the mixing chamber, and the hot waste gases exit the housing along the inside surfaces of the housing side and end walls and particularly the inboard wall of the intermediate chamber such that the heat or Btu's heat this wall and thereby preheat the fresh fuel/air admixture in the intermediate chamber. Thus, as the fuel/air admixture exits the mixing tube, it is preheated incident to reaching the mixing chamber.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 20 is another fastening system similar to that of FIGS. 2, 12 and 16, and illustrates variations therein.

FIG. 21 is a fragmentary sectional view taken generally along line XXI—XXI of FIG. 20, and illustrates details of the fastening system.

FIG. 22 is a side elevational view taken generally in the direction of the arrow XXII of FIG. 21.

DESCRIPTION OF THE PREFERRED EMBODIMENTS

Figures 1, 2, 3:
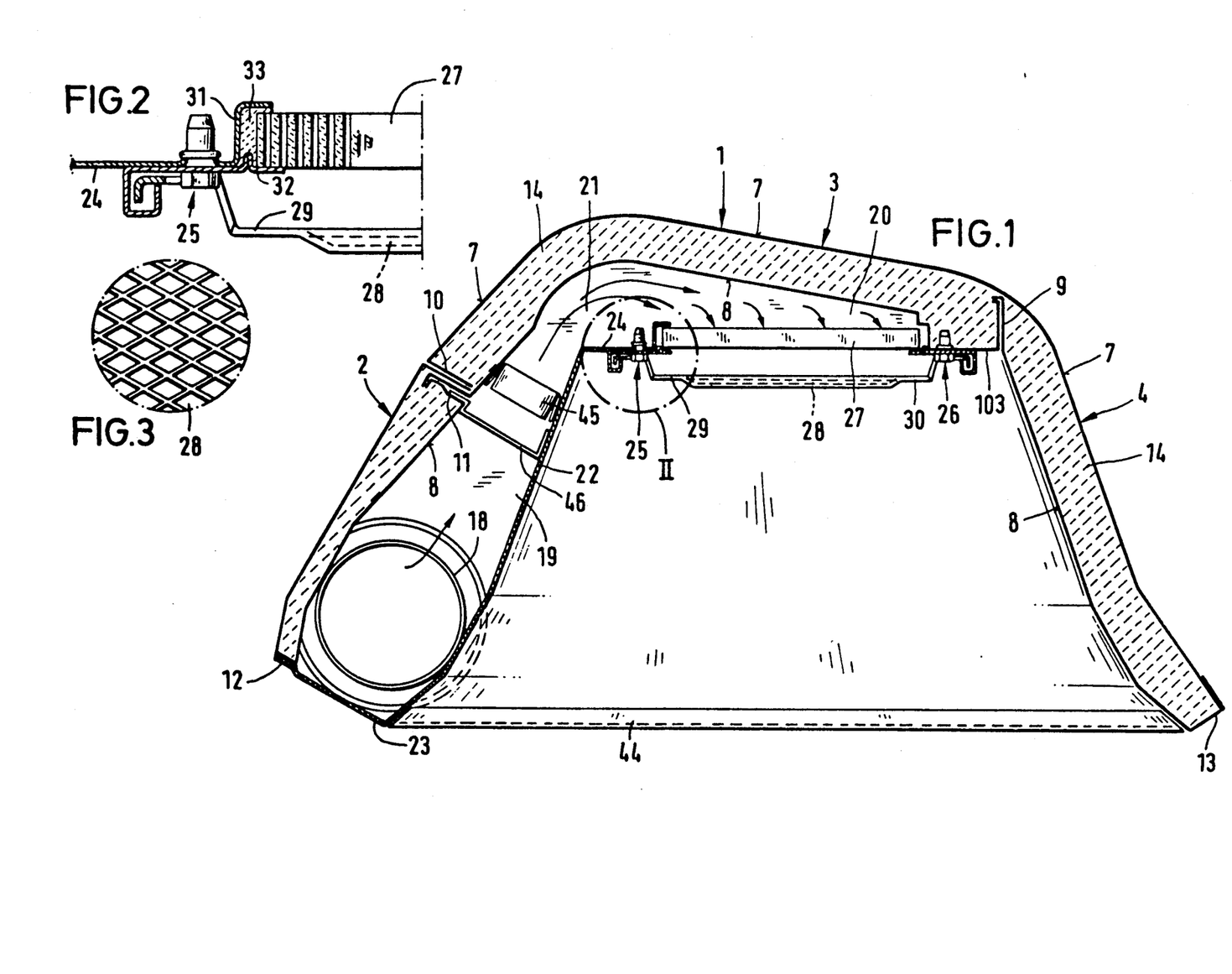
FIG. 1 is a transverse cross-sectional view taken along line I—I of FIG. 4 through a radiation heater of the present invention, and illustrates a mixing tube adjacent a lower end of an intermediate chamber which in turn converges upwardly toward a transition zone in fluid communication with a mixing chamber downstream of which is a ceramic burner plate and a radiation grid.
FIG. 2 is an enlarged fragmentary cross-sectional view of the encircled portion II of Figure and illustrates details of a connector for fastening the burner plate and radiation grid to a terminal inner edge of a wall in part defining the intermediate chamber.
FIG. 3 is a circular fragmentary top plan view of a portion of the radiation grid, and illustrates numerous ducts therethrough.
Figure 4:
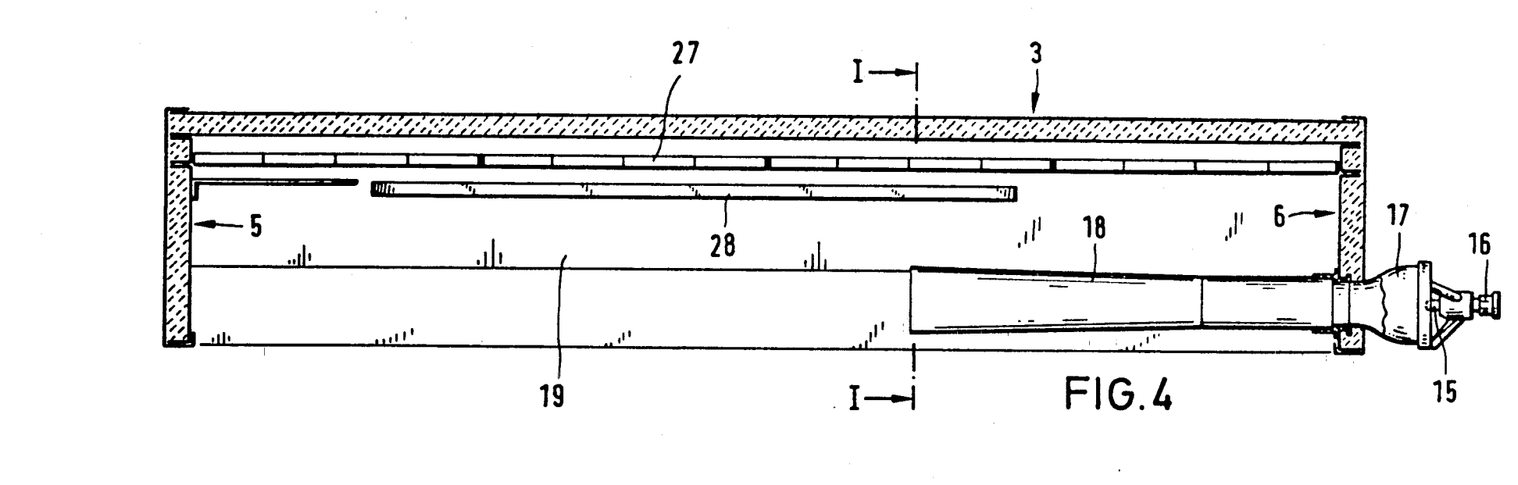
FIG. 4 is a simplified or diagrammatic vertical longitudinal sectional view taken lengthwise through FIG. 1 on a reduced scale, and illustrates the intermediate chamber spanning the distance between end walls of the housing, a mixing tube projecting into the intermediate chamber, and an injector nozzle and an adapter of the mixing tube.

A novel radiation heater constructed in accordance with this invention is illustrated in FIGS. 1 and 4 of the drawings, and is generally designated by the reference numeral 1. The radiation heater 1 is an infrared radiator, as are the remaining radiation heaters to be described hereinafter, which operates on a gaseous admixture of air and fuel.

The radiation heater 1 includes a housing 2, 3, 4, etc. open at its lower side or bottom peripheral edge (unnumbered) which is illustrated in an operational position in which the direction of radiation is vertically downward. However, another arbitrary operational position could be selected to direct the radiation obliquely to the horizontal, if desired. The latter can be accomplished by pivoting the radiation burner 1 and the housing 2, 3, 4, etc. clockwise from the position shown in FIG. 1 to the desired oblique position. The remaining radiation heaters to be described hereinafter can also be pivoted from the illustrated positions to desired oblique positions.

The housing 2, 3, 4, etc. of the radiation burner 1 includes two lateral or side walls 2, 4 connected at upper end (unnumbered) with a top or ceiling wall 3. The two side walls 2, 4 diverge away from each other in a downward direction away from the top wall 3 to thereby impart a substantially trapezoidal cross-sectional configuration to the housing 2, 3, 4, etc., as is clearly evident from FIG. 1. Due to the substantially trapezoidal cross-sectional configuration and the slight inclination of the top wall 3, a mixing chamber 20 immediately therebeneath is also essentially trapezoidal in transverse cross-section, again as is also evident from FIG. 1. The top wall 3 is thereby somewhat higher at the left side than at the right side, as viewed in FIG. 1, and thus the mixing chamber 20 is of a greater height, as viewed in FIG. 1, at its left side than at its right side. The housing 2, 3, 4, etc., including its individual side walls 2, 4, its top wall 3 and end walls 5, 6 (FIG. 4) thereof are double walls defined generally by an outer wall or sheet 7 and an inner wall or sheet 8 having associated bent longitudinal edges 9, 10 and 11 which permits these longitudinal edges to be readily connected together while simultaneously serving as reinforcements or spacers. Preferably, the sheets 7, 8 are sheet metal and can be connected, as necessarily desirable, by riveting or sheet metal screws (not shown). Peripheral ends sheets 12, 13 (FIG. 1) are secured to the peripheral edge (unnumbered) of the housing opening (unnumbered). The spacer gap (unnumbered) between the two space sheets or walls 7, 8 is filled with thermal insulation 14, such as mineral wool.

The mixing chamber 20 must be as compact as possible in order to achieve an extensive uniform distribution of the admixed air and fuel over the entire surface of a ceramic burner plate 27 housed in an upper portion of the housing 2, 3, 4, etc. The mixing chamber 20 is downstream from a transition zone or chamber 21 which in turn is in fluid communication with an intermediate chamber 19, as is best illustrated in FIG. 1. The ceramic burner plate 27 includes numerous combustion ducts (unnumbered) passing vertically therethrough, as is most evident from FIG. 2. The expression "ceramic burner plate" is intended to mean more than a single plate because a single rectangular ceramic burner plate at best suffices only on occasion in very small radiation heaters. However, in order to achieve more heating in large radiation heaters, the burner plate 27 is advantageously formed of a large row of plates mounted tightly one behind another in a plane perpendicular to the plane of FIG. 1. Furthermore, such burner plates 27 are generally aligned in edge-to-edge relationship to each other and in a generally common plane, as is clearly illustrated in FIG. 4. A radiation grid or screen 28 is mounted a predetermined distance away from and downstream of the burner plate 27 on the radiation side thereof. The radiation grid 28 is preferably made of metal. The radiation plate 28 also includes opposite edges 29, 30 which are bent upwardly and are fixed to fastening or connector systems 25, 26.

The fastening system 25 includes a sheet metal binding or flange 32 which includes a looped end (unnumbered) underlying the edge 29 of the radiation grid 28 and an opposite end (unnumbered) underlying the burner plate 27. Another sheet metal binding or flange 31 is a bent terminal end portion 24 of an inboard or inside wall 22 (FIG. 1) which in part defines the intermediate chamber 19. A rivet (unnumbered) retains the metal bindings or flanges 31, 32 in the assembled condition shown in FIG. 2 and, thus, maintains the radiation grid 28 and the burner plate 27 assembled to the terminal end portion or flange 24 of the inboard wall 22. Preferably, an L-shaped refractory seal 33 is sandwiched between the edge (unnumbered) of the burner plate 27 and the ends of the flanges 31, 32 (FIG. 2). The fastening system 26 is essentially identical to the fastening system 25 except the rivet of the fastening system 26 of FIG. 1 is attached to a bent terminal edge 103 of the inner housing wall 9.

The radiation heater 1 is also provided with means for supplying an air/fuel admixture to the mixing chamber 20 via the transition chamber 21 and the intermediate chamber 19. The fuel/air admixture apparatus includes an injector nozzle 15 (FIG. 4) having a connector 16 for connection to a fuel line. The fuel passes from the injection nozzle 15 through an adapter 17 into a mixing tube 18 of the injection nozzle 15. Through the venturi effect of the mixing tube 18, the air and fuel are admixed therein, and the admixture is injected into the intermediate chamber travelling therefrom to the mixing chamber 20 via the transition chamber 21. It is important for the injector nozzle 15 and the mixing tube 18 to be mounted at the lower peripheral edge (generally 12, FIG. 1) of the lateral housing wall 2 at the housing bottom, as is best illustrated in FIGS. 1 and 4. If the housing 2, 3, 4, etc. is of an elongated configuration, as in the present embodiment, then advantageously the mixing tube 18 is also mounted generally parallel to the longitudinal edge 12 (See FIG. 2). In this manner, the mixing tube 18 is located at the bottom of the intermediate chamber 19 and the latter essentially surrounds the mixing tube 18 and closes the same on all sides except for the opening at the upper end of the intermediate chamber 19 into the transition chamber 21. Preferably, the intermediate chamber 19 is closed at its lower end (generally 12) by an edge 23 of the inside wall 22 which is bent and fastened to the sheet metal at the peripheral end 12 by rivets or the like. The mixing tube 18 also projects into the intermediate chamber 19 only over part of the length of the latter (See FIG. 4) while the intermediate chamber 19 extends the entire length of the housing 2, 3, 4, etc. between the end walls 5, 6 (FIG. 4) and converges or tapers upwardly generally trapezoidally in its cross-section toward and into communication with the transition zone or chamber 21, as is best illustrated in FIG. 1. Obviously, the admixed fuel and air exiting the mixing chamber 20 passes through the ceramic burner plate 27 and burns in a flameless manner on the lower side of the burner plate 27, thus heating foremost its lower side which in turn emits mainly infrared radiation. Further radiation is generated by the heating of the radiation grid 28. Radiation and thus heating is improved by the transverse trapezoidal cross-section of the housing 2, 3, 4, etc., and particularly the downward divergency of the side walls 2, 4, heretofore described. More specifically, the inner wall 8 of the top wall 3 and the side wall 4 and the inside wall 22 of the intermediate chamber 19 act as reflectors thereby increasing the radiation effect of the radiation heater 1. Furthermore, the hot waste gases can escape only through the open lower end of the housing 2, 3, 4, etc. and as the hot waste gases flow downwardly along the walls 8, 22, and particularly along the wall 22, the wall 22 will be heated as will the interior of the intermediate chamber 19. Thus, the intermediate chamber 19 is heated and through heat exchange, the fuel/air admixture in the intermediate chamber 19 is preheated within the intermediate chamber 19 prior to exiting the same at the transition chamber and entering the mixing chamber 20. By thus preheating the admixed fuel/air in the intermediate chamber 19, the combustion temperature at the burner plate 27 is increased to increase the overall efficiency of the radiation heater 1. The effect can be enhanced by pivoting the housing 2, 3, 4, etc. of the radiation heater 1 clockwise relative to that illustrated in FIG. 1 to an angle of less than 90 degrees, as, for instance, to a position of 30 through 45 degrees from that illustrated. In this case the hot waste gases will flow more intimately and intensively against the inside wall 22 transferring heat therethrough and into the intermediate chamber 19. Thus, in the position of the radiation heater 1 shown in FIG. 1 or when pivoted as aforesaid, it had been found that the air/fuel admixture in the intermediate chamber 19 can be preheated to a temperature to approximately 300° C. Such preheating of the air/fuel admixture in the intermediate chamber 19 creates several advantages, namely, on the one hand the air/fuel admixture introduced at the bottom of the intermediate chamber 19 receives an uplift or updraft which substantially enhances the suction at the intake of the mixing tube 18, and at the same time this allows the burner 27 to operate at desirable low gas pressures. The efficiency of the radiation heater 1 is further augmented by advantageously providing sheet metal distribution baffles 45, 46 in the intermediate chamber 19 in those cases where the radiation heater 1 is rather long or elongated.

Reference is now made to FIGS. 5 through 8 of the drawings which includes another embodiment of the invention with identical structure bearing the same reference numerals as those appearing in FIGS. 1 through 4.

Figure 5:
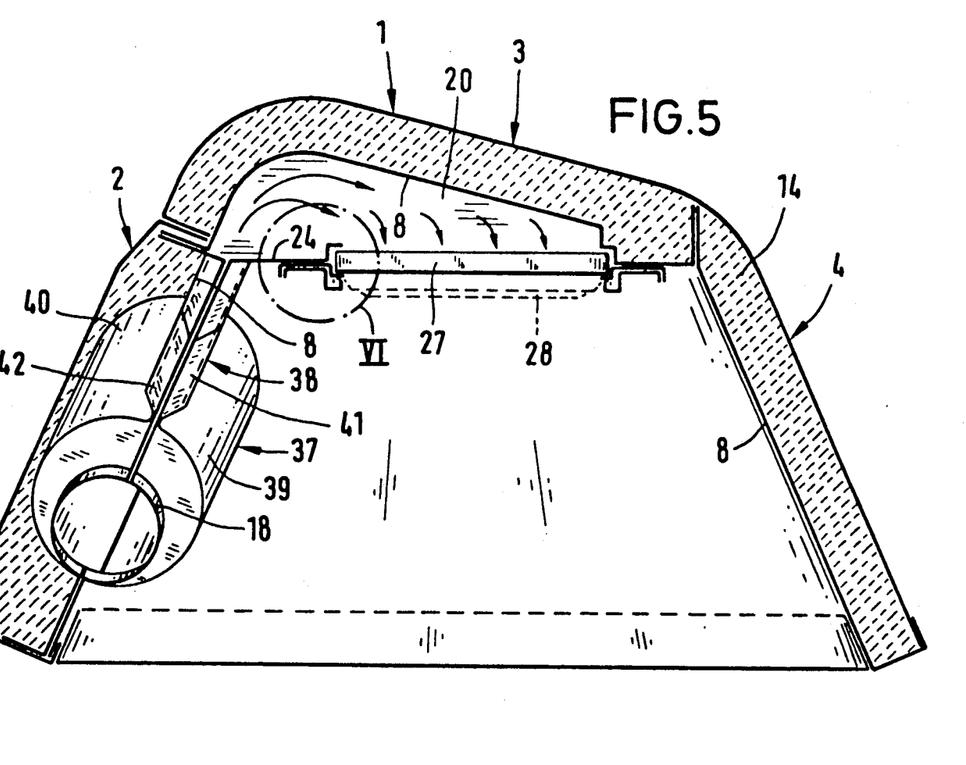
FIG. 5 is a vertical transverse cross-sectional view taken along line V—V of FIG. 8 of another radiation heater of the present invention, and illustrates a generally cylindrical intermediate chamber having an axis defining an acute angle with a longitudinal axis of the burner housing.
Figure 7:
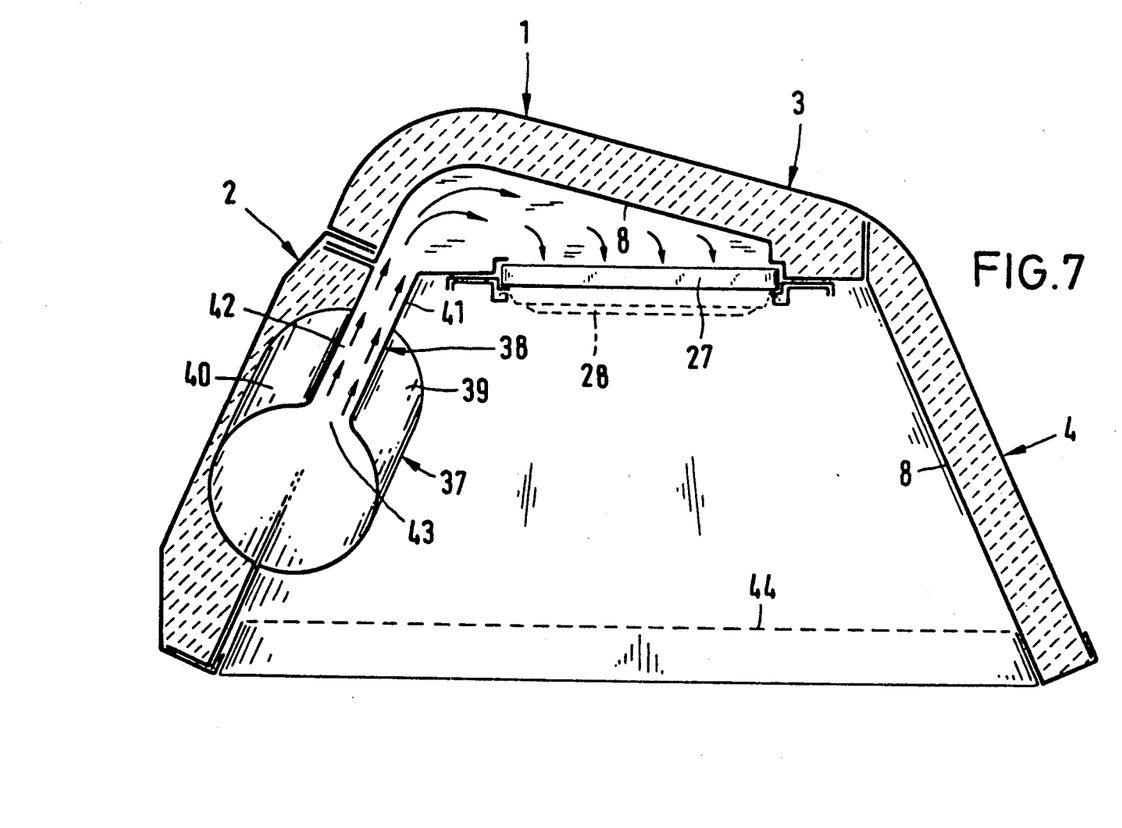
FIG. 7 is a cross-sectional view taken generally along line VII—VII of FIG. 8, and illustrates more clearly the inclination of the intermediate chamber and a duct thereof in fluid communication with the transition chamber incident to feeding the air/fuel admixture into the mixing chamber.
Figure 8:
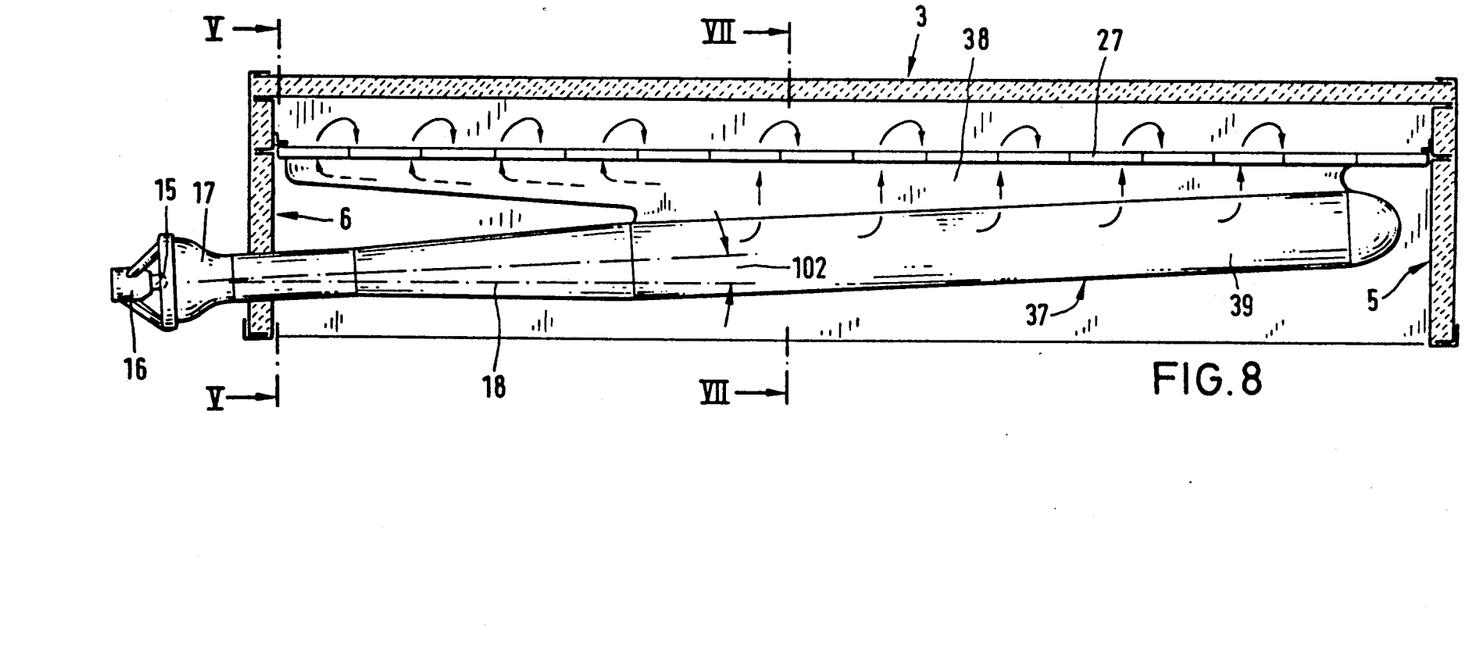
FIG. 8 is a vertical longitudinal sectional view taken through the radiation heater of FIGS. 5 and 7, and illustrates more clearly the inclination of the mixing chamber and the mixing tube relative to the longitudinal axis of the burner housing.

In the design of the radiation heater 1 of FIGS. 5, 7 and 8, the mixing tube 18 (FIGS. 5 and 8) and the intermediate chamber 37 are disposed in the housing 2, 3, 4, etc. at an acute angle 102 relative to the horizontal (not shown) or a plane taken through the peripheral bottom edge of the housing 2, 3, 4, etc. The angle 102 of the mixing tube 118 ascends from left-to-right in FIG. 8 or, in other words, is inclined upwardly in a direction away from the injector nozzle 15. The acute angle inclination 102 of the mixing tube 18 enhances the uplift or updraft of the preheated air/fuel admixture. Also, in order to simplify the design, the intermediate chamber 37 is defined as a cylindrical cavity defined by semicylindrical shells or shell portions 39, 40, each merging with respective walls 41, 42 collectively defining a duct 38. The duct 38 defines a slot 43 opening into the intermediate chamber 37 and conducts the air/fuel admixture to the burner 27. The mixing tube 18 is also a venturi tube, as in the case of the radiation heater 1 of FIGS. 1 and 4.

Figure 6:
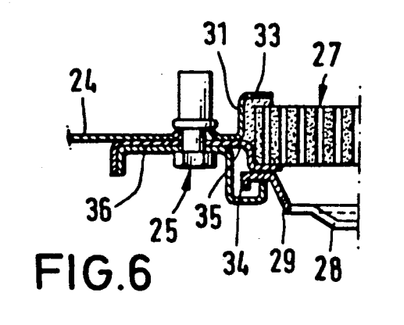
FIG. 6 is an enlarged fragmentary view of the encircled portion VI of FIG. 5, and illustrates details of a connection between a terminal edge of a wall defining the intermediate chamber, the burner plate and the radiation grid.

Reference is made to FIG. 6 of the drawings which illustrates another fastening system similar to that illustrated in FIG. 2 of the drawings, except in this case two sheet metal bindings or flanges 35, 36 are provided with the latter engaging the edge 29 of the radiation grid 28 and the former engaging the burner plate 27. In this manner the ends (unnumbered) of the bindings or flanges 31, 35 collectively define a generally U-shaped channel in which is retained and fastened the refractory seal 33 and the edge of the burner plate 27. It should also be appreciated that the semicylindrical shell 40 of the intermediate chamber 37 is formed by so curving the inner wall 8 of the double-wall housing 2, 3, 4, etc.

Figure 9:
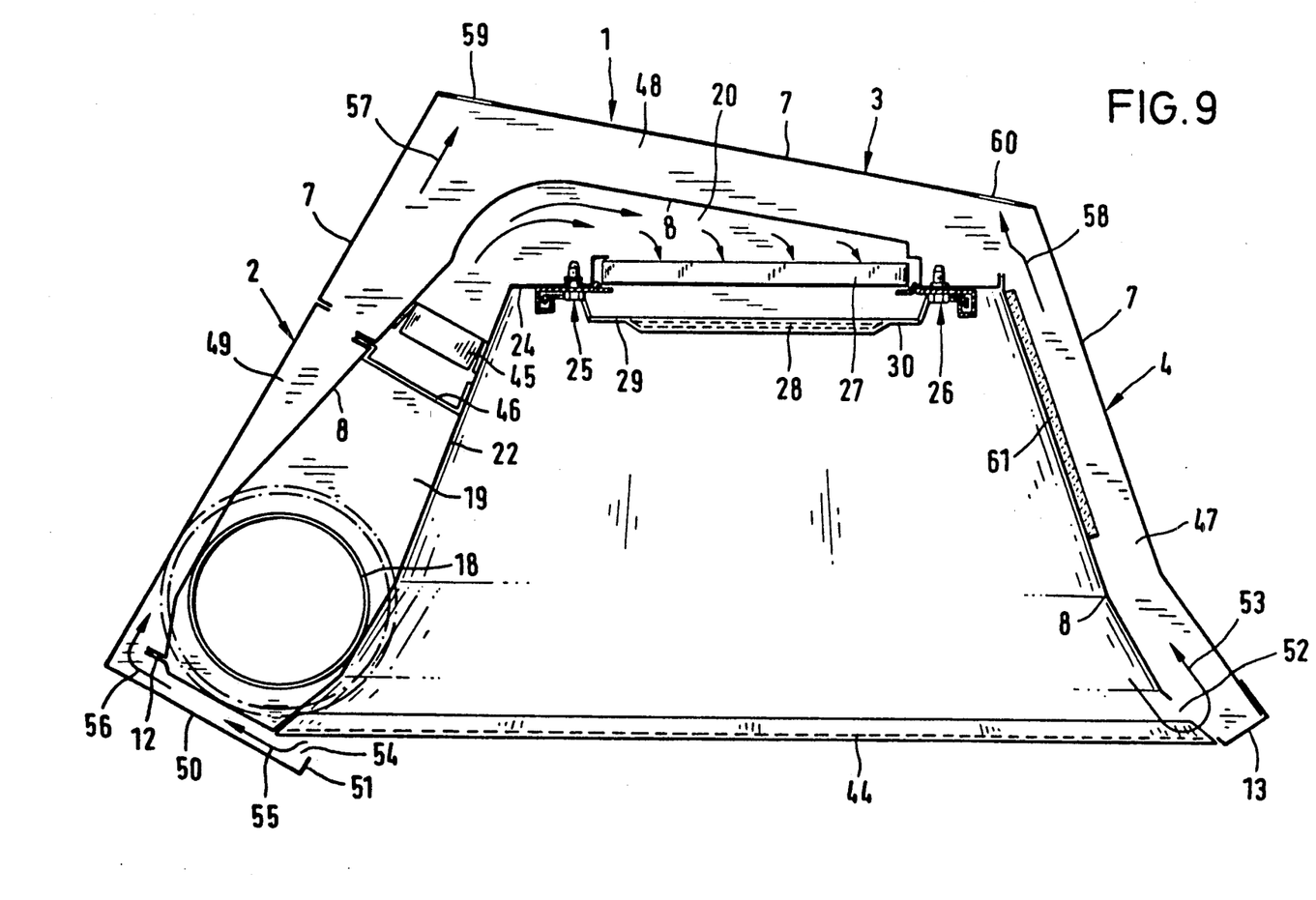
FIG. 9 is a transverse cross-sectional view through another radiation heater of the invention, and illustrates hot gas flow through the double wall of the housing.

FIG. 9 illustrates another preferred embodiment of a radiation heater 1 of the present invention in which case two walls 7, 8 of the double-wall housing 2, 3, 4, etc. are so spaced apart as to define intercommunicating gaps 47, 48 and 49 association with the walls 4, 3 and 2, respectively. The outer wall 7 is unilaterally extended beyond the left lower edge 12 of the side wall 2, and the extension thereof is defined by a terminal edge 50 having an upwardly directed flange 51. The flange 51 is inboard of the inside wall 22 and inside the lowermost peripheral edge of the overall housing 2, 3, 4, etc. Thus, as the hot waste gases descend from the burner plate 27 downwardly along the walls 5, 6, 8 and 22, and particularly downwardly along the inner wall 22, the gases moving along in intimate relationship to the wall 22 are guided into a channel (unnumbered) between the bent bottom edge 12 and the terminal edge 50. The channel is defined in part by a flange 51 which forms an opening 54 of the channel in conjunction with the most immediate lower portion (unnumbered) of the inside wall 22. These hot gases follow a flow path into the opening 54 and through the channel defined by the numbered arrows 55, 56 and 57 and exit the outer wall 7 through a vent opening or aperture 59. Another longitudinal slot 52 or opening is formed along the edge 13 of the side wall 4 through which the gases travelling downwardly along the inside wall 8 of the side wall 4 flow and enter along the flow path indicated by the arrow 53 and continue in the direction of the arrow 55 eventually exiting through a vent opening or aperture 60 in the outer wall 7 of the top wall 3. Obviously, the hot gases which flow along the flow path designated by the arrows 55 through 57 further effect preheating of the air/fuel admixture in the intermediate chamber 19 as they pass along the bottom wall or vent portion 12 and upwardly along the inner wall 8 of the side wall 2. Thus, the mixing chamber 19 is heated by hot gases flowing downwardly along the inside wall 22, across the bottom of the bent wall portion 22, and up along the inner wall 8 in the gap 49. In order to prevent excessive heating of the inner wall 8 of the side wall 4, a thermal insulating plate 61, such as mineral wool, may be suitably mounted in the gap 47 on the outside surface of the inner wall 8. The slot or gap 54 runs the entire length of the radiation heater 1, as does the slot or gap 52. However, in lieu of the slots or gaps 52, 54, these may simply be a plurality of openings spaced lengthwise longitudinally along the bottom edges of the side walls 2, 4. Likewise, the vent holes or openings 59, 60 are located longitudinally or lengthwise along the top wall 3. The number of these openings 59, 60 can be varied and they may be located closer toward the center of the top wall 3 if, for example, it is desired to heat the air/fuel admixture further as it flows through the transition portion 21 and as it flows into and through the mixing chamber 20. The holes or openings 59, 50 can, of course, be slots disposed along the entire length of the top wall 3, as opposed to individual holes or openings 59, 60 spaced therealong.

Figure 10:
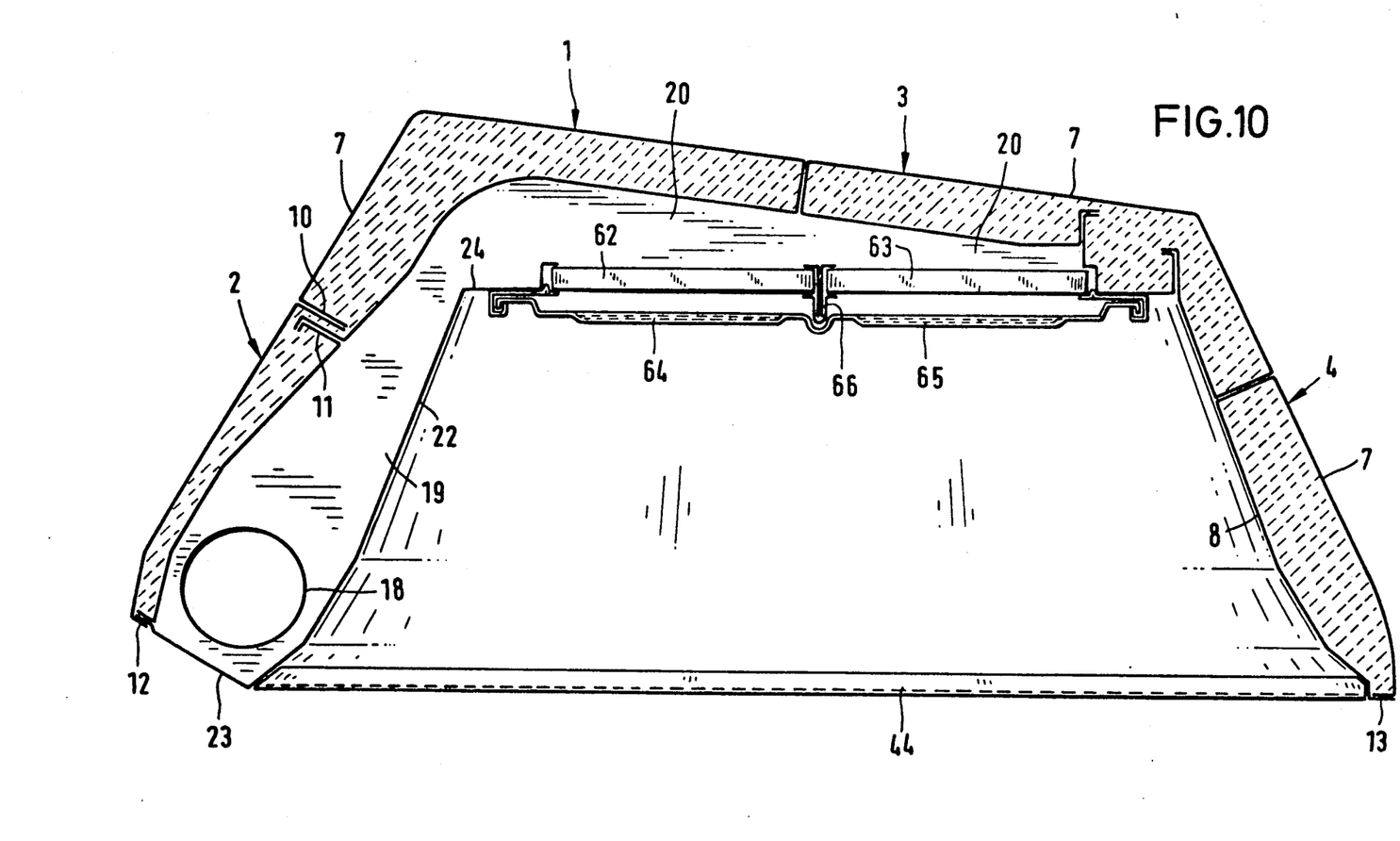
FIG. 10 is a transverse cross-sectional view of another radiation heater of the invention, and illustrates two symmetrical housings each carrying a burner plate and radiation grid, and one of the housings including an intermediate chamber and an air/fuel mixing tube.

Another radiation heater is illustrated in FIG. 10 of the drawings and is similar to the radiation heater of FIGS. 1 and 4, except the Btu output is higher because two ceramic burner plates 62, 63 are mounted edge-to-edge in generally a single plane which effectively transversely widens the overall housing 2, 3, 4, etc. The burner plate 62, 63 of FIG. 10 are identical to the ceramic burner plate 27 of FIG. 1, and each is associated with a respective radiation grid 64, 65. An intermediate fastener or fastening system 66 unites the burner plates 62, 63, and both burner plates 62, 63 are fed the air/fuel admixture from a common mixing chamber 20 which is in turn fed from the intermediate chamber 19.

Figure 11:
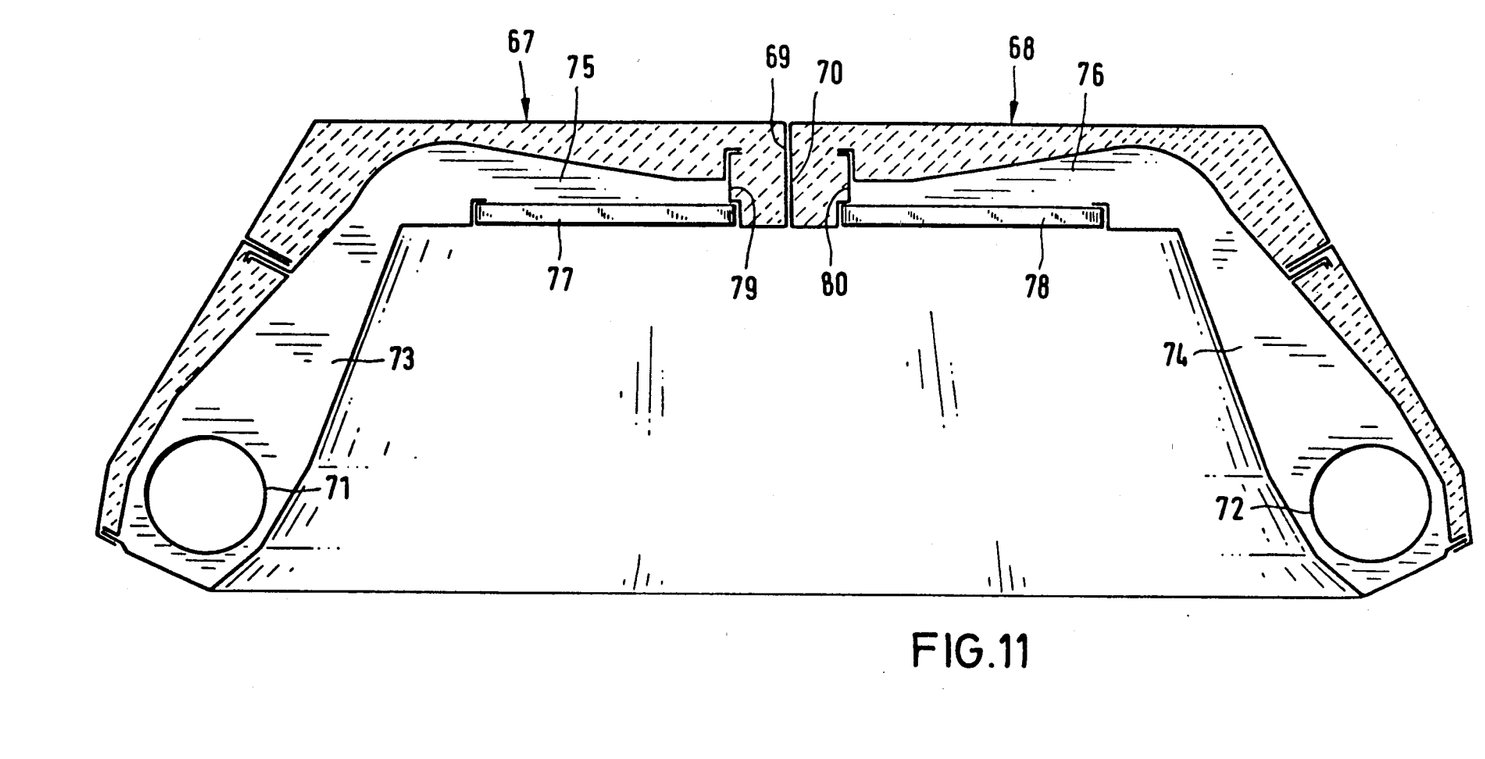
FIG. 11 is a transverse cross-sectional view of another radiation heater of the invention, and illustrates two symmetrical housing halves each of which includes an intermediate chamber, a mixing tube in the intermediate chamber, a mixing chamber and a burner plate associated therewith.

Reference is now made to FIG. 11 of the drawings which shows another embodiment of a radiation heater constructed in accordance with this invention in which a housing 67, 68 is formed of two generally identical, though reverse image housing parts or portions 67 and 68. This construction reduces the manufacturing cost for a relatively large powerful radiation heater. The two housing parts 67, 68 are illustrated in very simplified form and are connected to each other along sheet metal edges 69, 70 by conventional sheet metal fasteners or clips (not shown). Two burner plates 77, 78 are also associated one each with respective mixing chamber 75, 76. In this case the burner plates 77, 78 are individually supplied an air/fuel admixture from individual mixing tubes 71, 72 through respective intermediate chamber 73, 74. Also, terminal end portions 79, 80 of the outer all (unnumbered) of the housing part 67, 68 are bent inwardly and are suitably connected to the respective burner plates 77, 78.

Reference is now made to FIGS. 12 through 22 of the drawings which illustrate several different preferred fastening systems utilized in conjunction with the various radiation heaters of the present invention. The different fastening systems or connectors can vary due to many factors, as for example, different coexpansions of the materials of the components of the various radiation heaters, the requirement that some play be provided for motion in the fastening systems, while at the same time requiring that the edges of the burner plates be clamped in a gas-tight manner, etc.

Figure 12:
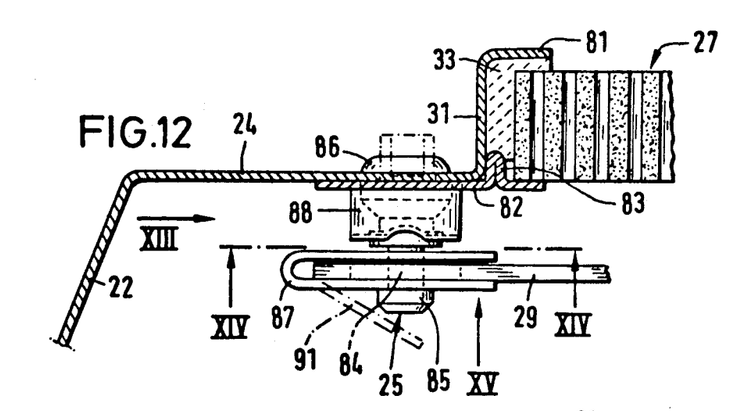
FIG. 12 is an enlarged fragmentary view similar to the encircled portion II of FIG. 1, but illustrates another fastening system for uniting an edge of the wall of the intermediate chamber to the burner plate and radiation grid.
Figure 13:
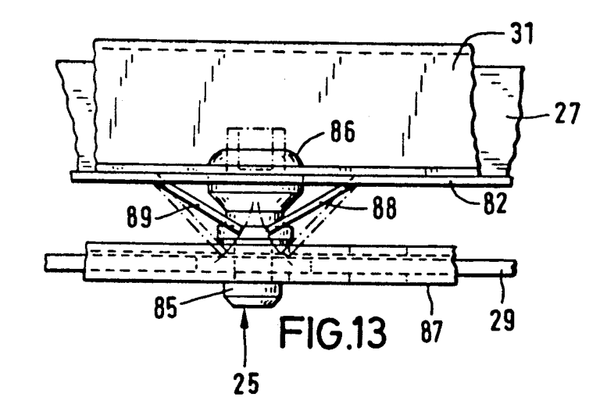
FIG. 13 is a fragmentary side elevational view taken generally in the direction of the arrow XIII of FIG. 12, and illustrates details of the fastening.
Figure 14:
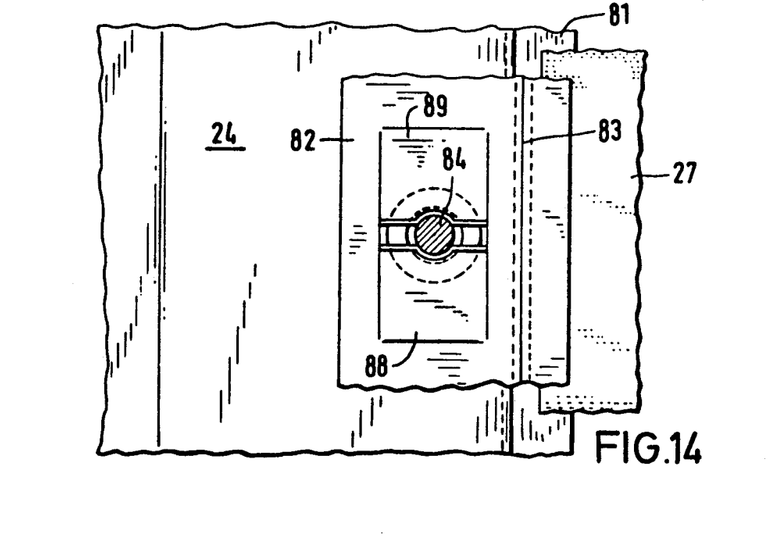
FIG. 14 is a fragmentary cross-sectional view taken generally along line XIV—XIV of FIG. 12.
Figure 15:
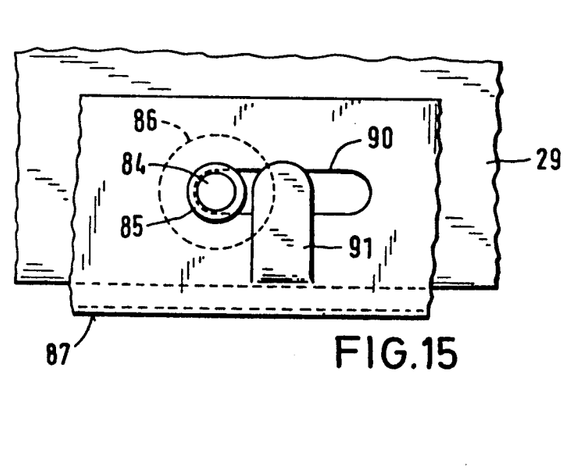
FIG. 15 is a bottom plan view of the fastener of FIG. 12 taken generally in the direction of the arrow XV of FIG. 12.
Figure 16:
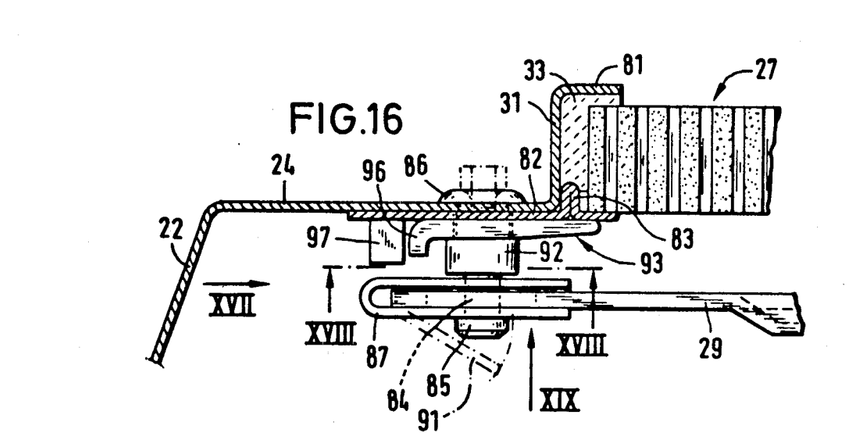
FIG. 16 is another fastening system similar to that of FIGS. 2 and 12, but illustrates another variation thereof.
Figure 17:
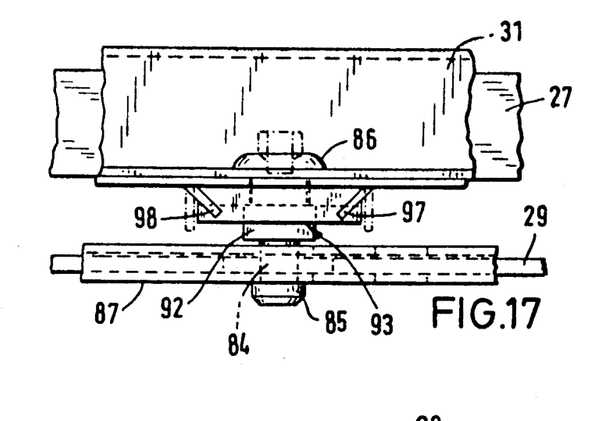
FIG. 17 is an end elevational view taken generally in the direction of the arrow XVII of FIG. 16, and illustrates details of the fastening system.
Figure 18:
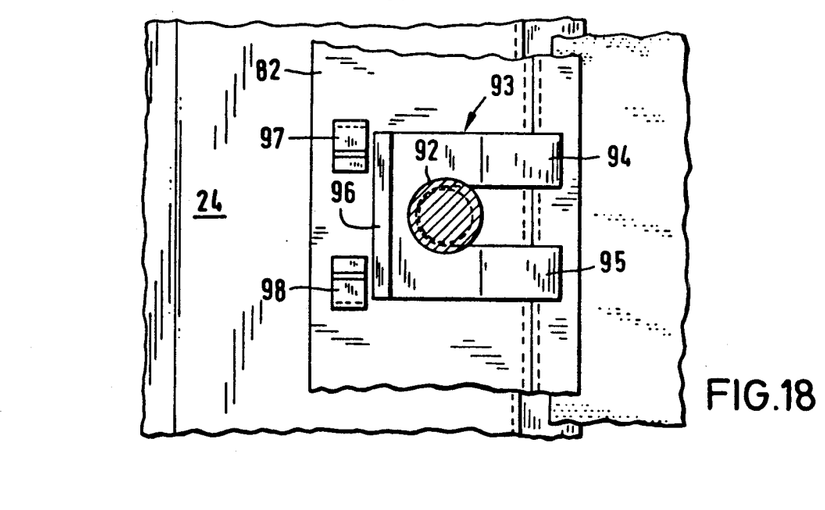
FIG. 18 is a cross-sectional view taken generally along line XVIII—XVIII of FIG. 16, and illustrates further details of the fastening system.
Figure 19:
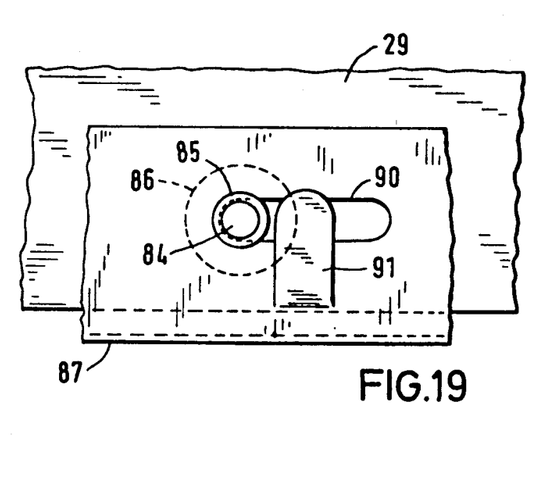
FIG. 19 is a bottom fragmentary view taken generally in the direction of the arrow XVIII of FIG. 16.

In one preferred embodiment shown in FIGS. 12 through 15 a sheet metal binding or flange 31 grips an edge 24 of the inside wall 22 by means of a strip-like portion 81 bent around the L-shaped seal 33. At the same time the edge of the ceramic burner plate 27 is held by an inboard strip-like portion of intermediate sheet metal 82 having a fold 83. The fastening of the radiation grid edge 29 is through the utilization of a shank 84 of a rivet 85 of the fastening system 25 which rivet shank 84 passes through a U-shaped retainer which houses the flange 29. A lower leg (unnumbered) of the U-shaped retainer 87 rests upon the head (unnumbered) of the rivet 85 while an opposite deformed end 86 of the rivet bears against the terminal flange 24 of the inside wall 22 (See FIG. 1). In order to simplify the assembly and ensure displacement when affixing the flange 29 of the radiation grid 28, sheet metal parts 88, 89 are struck and bent from the intermediate sheet metal 82 in a downward and oblique fashion, as is best illustrated in FIGS. 12 and 13. Another sheet metal portion 91 is struck and extends downward obliquely from the lower leg (unnumbered) of the retainer 87 and functions as a lock against displacement.

Another fastening system or connector system is shown in FIGS. 16 through 19 of the drawings, and the components thereof corresponding to those described heretofore are denoted by the same reference numerals. In this case the fastening system includes a U-shaped wedge 93 of which bi-lateral legs 94, 95 pass over a cylindrical reinforcement 92 of a shank 84 of the rivet 85. Two sheet metal portions 97, 98 (FIG. 17) are struck from the sheet metal and are bent downwardly to prevent the wedge 93 from displacement or shifting and, thus, act as a stop for a flange 96 formed as an integral downwardly bent portion of the U-shaped wedge 93.

A final fastening system is shown in FIGS. 20 through 22 of the drawings, and again includes elongated slots and projecting sheet metal parts 97, 98 which lock an enlarged portion 102 of the shank 84 of the rivet 85. The rivet 85 may be selectively displaced into the upper or into the lower position and then secured by the sheet metal parts 97, 98 against substantial displacement. Curved portions 99, 100 (FIG. 22) are provided which rest against a cylindrical reinforcement 92 of the shank 84 and provide requisite elasticity.

Although a preferred embodiment of the invention has been specifically illustrated and described herein, it is to be understood that minor variations may be made in the apparatus without departing from the spirit and scope of the invention, as defined the appended claims.

I claim:

1. A radiation heater comprising a substantially double-wall housing defined in part by a top wall and a pair of lateral walls diverging away from said top wall and imparting therewith a substantially trapezoidal transverse cross-sectional configuration to said housing, said housing having an opening defined by a peripheral edge remote from said top wall, a mixing chamber in said housing immediately adjacent said top wall for admixing fuel and air, a burner plate adjacent said mixing chamber and between said mixing chamber and a radiation grid; and injector nozzle, a mixing tube and an intermediate chamber being sequentially arranged for supplying fuel to said mixing chamber, said intermediate chamber being defined by one of said pair of lateral walls and a wall inboard and spaced therefrom, said intermediate chamber being in fluid communication with said mixing chamber, said injection nozzle and mixing tube being located at a position remote from said mixing chamber, said mixing chamber being constructed and arranged for presenting hot waste gases against an exterior surface of said inboard wall thereby preheating the same and preheating the fresh admixture of air and fuel in said intermediate chamber, said housing being relatively elongated in its length relative to the transverse cross-sectional length thereof, and said mixing tube and injector nozzle being located immediately adjacent a peripheral edge portion of said peripheral edge along said one lateral wall and remote from said mixing chamber.

2. The radiation heater as defined in claim 1 wherein said housing further includes a pair of spaced end walls the distance between which defines the length of said housing, said mixing and intermediate chambers ar generally each coextensive in length to the length of said housing, said mixing and intermediate chambers merge along their lengths at a transition chamber, and said intermediate chamber converges in cross-section in a direction toward said transition chamber.

3. The radiation heater as defined in claim 1 wherein said intermediate chamber is disposed at an acute angle to a longitudinal axis of said housing.

4. The radiation heater as defined in claim 1 wherein said intermediate chamber is of a substantially cylindrical configuration and includes an elongated slot communicating with a duct in fluid communication with said mixing chamber.

5. The radiation heater defined in claim 1 wherein said intermediate chamber is formed of two substantially symmetrical walls.

6. The radiation heater as defined in claim 1 wherein said intermediate chamber is of a substantially cylindrical configuration and includes an elongated slot communicating with a duct in fluid communication with said mixing chamber, and said intermediate chamber and duct are formed of two substantially symmetrical walls.

7. The radiation heater as defined in claim 1 wherein said mixing tube is a venturi tube.

8. The radiation heater as defined in claim 1 wherein said one lateral wall and inboard wall are each curved and the curved walls open in opposed relationship to each other.

9. The radiation heater as defined in claim 1 wherein said intermediate and mixing chambers are in fluid communication with each other at a transition chamber, and said mixing chamber converges in a direction toward said transition chamber.

10. The radiation heater as defined in claim 1 including a second burner plate disposed in edge-to-edge relationship to said first-mentioned burner plate in said mixing chamber which are collectively fed a common air and fuel admixture from said intermediate chamber.

11. The radiation heater as defined in claim 1 including a second burner plate disposed in edge-to-edge relationship to said first-mentioned burner plate in a generally common plane in said mixing chamber which are collectively fed a common air and fuel admixture from said intermediate chamber.

12. The radiation heater as defined in claim 1 wherein said double-wall housing defines a gap filled with thermal insulating material.

13. The radiation heater as defined in claim 1 wherein said lateral wall is defined by relatively spaced inner and outer walls defining a gap therebetween, said outer wall includes a terminal edge spaced from a lowermost wall portion of said intermediate chamber, said terminal edge projects into said opening whereby hot waste gases traveling along said inboard wall exterior surface are guided by said terminal edge into said gap, and means in said outer wall for venting gases in said gap to atmosphere.

14. The radiation heater as defined in claim 1 wherein said lateral wall is defined by relatively spaced inner and outer walls defining a gap therebetween, said outer wall includes a terminal edge spaced from a lowermost wall portion of said intermediate chamber, said terminal edge projects into said opening whereby hot waste gases traveling along said inboard wall exterior surface are guided by said terminal edge into said gap, means in said outer wall for venting gases in said gap to atmosphere, another of said lateral walls is defined by relatively spaced inner and outer walls defining a gap therebetween, and a plate of thermal insulating material mounted in said last-mentioned gap upon said last-mentioned inner wall.

15. The radiation heater as defined in claim 1 wherein said intermediate chamber is affixed to and in part defined by said one lateral wall.

16. The radiation heater as defined in claim 1 including distributor baffles in said intermediate chamber.

17. The radiation heater as defined in claim 1 wherein said inboard wall includes a terminal edge adjacent said burner plate, said burner plate and said radiation grid each have terminal edges, and means for fastening said terminal edges together thereby fastening said burner plate and radiation grid to said inboard wall terminal edge.

18. A radiation heater comprising a pair of substantially identical double-wall housings each defined in part by a top wall and a lateral wall, said top walls having adjacent longitudinal edges in adjacent relationship, said lateral walls diverging away from said top walls and imparting therewith a substantially trapezoidal transverse cross-sectional configuration to said housings, said housings collectively defining an opening defined by a peripheral edge remote from said top walls, a mixing chamber in each housing for admixing fuel and air, a burner plate adjacent each mixing chamber and between each mixing chamber and an associated radiation grid, an injector nozzle and a mixing tube for supplying fuel to each of said mixing chambers, one each of said lateral walls and a wall inboard and spaced therefrom defining an intermediate chamber, each said intermediate chamber being in fluid communication with an associated mixing chamber, each injection nozzle and mixing tube being located in an associated intermediate chamber at a position remote from its mixing chamber, and each mixing chamber is constructed and arranged for presenting hot waste gases against an exterior surface of its associated inboard wall thereby preheating the same and preheating the fresh admixture of air and fuel in its associated intermediate chamber.

* * * * *